US012321960B2

(12) United States Patent
Maloney et al.

(10) Patent No.: US 12,321,960 B2
(45) Date of Patent: Jun. 3, 2025

(54) METHOD AND SYSTEM FOR IMPROVED SEGMENTATION OF LARGE DATASETS USING AI

(71) Applicant: NEURALIFT.AI INC., Livingston, NJ (US)

(72) Inventors: Victor Michael Maloney, North Hampton, NH (US); Soren Macbeth, Portland, OR (US); Jonathan Mendez, Livingston, NJ (US)

(73) Assignee: NEURALIFT.AI INC., Livingston, NJ (US)

( * ) Notice: Subject to any disclaimer, the term of this patent is extended or adjusted under 35 U.S.C. 154(b) by 0 days.

(21) Appl. No.: 18/760,781

(22) Filed: Jul. 1, 2024

(65) Prior Publication Data
US 2025/0005612 A1    Jan. 2, 2025

Related U.S. Application Data

(60) Provisional application No. 63/511,167, filed on Jun. 29, 2023.

(51) Int. Cl.
*G06Q 10/0631* (2023.01)
*G06N 20/20* (2019.01)
(Continued)

(52) U.S. Cl.
CPC ......... *G06Q 30/0204* (2013.01); *G06N 20/20* (2019.01); *G06Q 10/06315* (2013.01); *G06Q 10/06393* (2013.01)

(58) Field of Classification Search
CPC ........... G06Q 30/0204; G06Q 10/0635; G06Q 10/06393; G05N 20/00
See application file for complete search history.

(56) References Cited

U.S. PATENT DOCUMENTS 11,275,756 B2 * 3/2022 Shah ................... G06F 16/285
11,373,049 B2 * 6/2022 Johnson Premkumar ................... G06F 40/58

(Continued)

FOREIGN PATENT DOCUMENTS

KR    20230151685 A  *  4/2022

OTHER PUBLICATIONS

Gopinath "The Shapley Value for ML Models" (2021) (https://towardsdatascience.com/the-shapley-value-for-ml-models-f1100bff78d1) (Year: 2021).*

*Primary Examiner* — Sujay Koneru
(74) *Attorney, Agent, or Firm* — Meister Seelig & Fein PLLC

(57) ABSTRACT

In an embodiment, a method for segmenting a large dataset into distinct segments using artificial intelligence (AI) is disclosed. The method includes receiving aggregated datasets including user data and user IDs assigned thereto, processing the datasets to extract user data characteristics, and creating distinct segments according to a segmentation pipeline based on the extracted user data characteristics. The method further includes predicting segment membership using explainable AI and assigning users into given ones of the distinct segments according to an ensemble machine learning-based segmentation model and the extracted user data characteristics. The method further includes receiving additional user data, refining the segmentation model according to the additional user data, and updating a set of the distinct segments according to the refined segmentation model.

22 Claims, 12 Drawing Sheets

(51) Int. Cl.
*G06Q 10/0639* (2023.01)
*G06Q 20/20* (2012.01)
*G06Q 30/0204* (2023.01)

(56) References Cited

U.S. PATENT DOCUMENTS

| | | | | |
|---|---|---|---|---|
| 2014/0114722 | A1* | 4/2014 | Mohan | G06Q 30/0201 |
| | | | | 705/7.29 |
| 2015/0046935 | A1* | 2/2015 | Wei | H04N 21/812 |
| | | | | 725/14 |
| 2016/0162917 | A1* | 6/2016 | Singh | G06Q 30/0204 |
| | | | | 705/7.33 |
| 2019/0362846 | A1* | 11/2019 | Vodencarevic | G16H 50/20 |
| 2020/0294231 | A1* | 9/2020 | Tosun | G06V 20/695 |
| 2021/0150548 | A1* | 5/2021 | Dua | G06F 18/2113 |
| 2021/0166151 | A1* | 6/2021 | Kennel | G06N 20/00 |
| 2021/0232940 | A1* | 7/2021 | Dalli | G06N 3/08 |
| 2021/0350202 | A1* | 11/2021 | Zachariah | G06Q 30/02 |
| 2022/0058431 | A1* | 2/2022 | Jang | G06V 10/28 |
| 2022/0067460 | A1* | 3/2022 | Raj | G06N 20/00 |
| 2022/0272125 | A1* | 8/2022 | Tora | G06N 20/00 |
| 2023/0005044 | A1* | 1/2023 | Panjabi | G06Q 30/0631 |
| 2023/0196116 | A1* | 6/2023 | Liss | G06N 7/01 |
| | | | | 706/25 |
| 2023/0205674 | A1* | 6/2023 | Sahu | G06N 20/00 |
| | | | | 717/125 |
| 2023/0245031 | A1* | 8/2023 | Lucas | G06Q 10/06393 |
| | | | | 705/7.39 |
| 2023/0245651 | A1* | 8/2023 | Wang | G06N 5/022 |
| | | | | 704/275 |
| 2023/0386473 | A1* | 11/2023 | Li | G10L 25/30 |
| 2023/0401461 | A1* | 12/2023 | Gueret | G06N 5/025 |
| 2024/0281219 | A1* | 8/2024 | Masad | G06F 8/33 |

* cited by examiner

FIG. 10

METHOD AND SYSTEM FOR IMPROVED SEGMENTATION OF LARGE DATASETS USING AI

CROSS REFERENCE TO RELATED APPLICATION

This application claims the priority of U.S. Provisional Application No. 63/511,167, entitled "Advanced Method and System for Customer Cohort Segmentation and Interpretation through Machine Learning and Model Explainability Techniques," filed on Jun. 29, 2023, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

This application relates to the field of Artificial Intelligence ("AI") and data analysis, and in particular, the application of machine learning algorithms, explainable AI techniques, and Large Language Models ("LLMs") for nuanced customer analysis, segmentation, optimization of company Key Performance Indicators ("KPIs"), and the development of tailored marketing strategies to enhance relevance and engagement.

Customer acquisition and conversion strategies have largely remained stagnant over the past two decades, predominantly relying on basic demographic or behavioral factors. This traditional approach frequently overlooks the intricate patterns in customer behavior and preferences, leading to suboptimal marketing outcomes and missed opportunities for personalized engagement.

The landscape of digital marketing has significantly evolved with the emergence of privacy concerns, the expansion of customer segments, and the enforcement of stringent privacy regulations such as the General Data Protection Regulation and the deprecation of cookies from web browsers. These developments have compounded the challenges businesses face in creating effective, personalized marketing strategies. Traditional segmentation and cohort creation methods which depend on user behavioral factors, simple event triggers and/or Structured Query Language queries to join data together by customers fail to capture the nuanced similarities and patterns in customer behavior, resulting in generic and less effective marketing efforts.

The necessity to optimize company KPIs and enhance marketing relevance has become increasingly critical in today's competitive market. Businesses must navigate the complexities of customer segmentation with greater precision to ensure their marketing strategies resonate with their target audiences. However, existing machine learning models used for customer segmentation often operate as "black boxes," making it difficult for businesses to understand and interpret the decision-making processes behind these models. This lack of transparency hinders the ability to leverage these models effectively and to build trust among stakeholders.

Thus, there is a need for improved customer segmentation model systems and methods that more accurately capture nuanced patterns in customer behavior. There is also a need for an improved system and method for explaining the segmentations made by such systems in the form of clear, accessible narratives that can be easily understood by non-technical stakeholders. The present invention addresses the limitations of traditional approaches and offers a robust, scalable, and interpretable solution for modern customer segmentation challenges, ultimately enhancing marketing effectiveness and business performance.

SUMMARY

The present invention introduces a novel and comprehensive method and system that integrates advanced machine learning techniques, explainable AI approaches, and LLMs to enable brands and companies to build, train, interpret, and action their own customer segmentation models with unparalleled precision and clarity.

The system employs a proprietary ensemble of machine learning algorithms to segment customers into distinct cohorts. It includes a robust pipeline that customizes for each client by learning from their specific data, incorporating denoising techniques to enhance data quality and model performance. This ensures that the segmentation is tailored to the unique characteristics of each customer's dataset, capturing intricate patterns and behaviors.

The segmentation pipeline begins with data ingestion, where various types of customer data, including demographics, behavioral data, transactional data, and other relevant information, are processed. The system then applies denoising autoencoders to clean and normalize the data, reducing noise and improving the accuracy of the subsequent segmentation.

Once the data is preprocessed, the system employs a suite of machine learning algorithms to create initial customer segments. These algorithms include techniques such as k-means clustering, hierarchical clustering, and density-based clustering, chosen based on their suitability for the specific data characteristics. The system continuously learns and adapts to the data, refining the segmentation model over time.

For each identified customer cohort, gradient boosting models are trained to predict cohort membership. The system employs Shapley value-based explanations and other interpretability techniques to reveal the most influential features driving these predictions. This approach ensures transparency and trust in the model's decision-making processes. Additional information on Shapley values and the game theory approach to explaining the output of machine learning models can be found at An Introduction to Explainable AI with Shapley Values, https://shap.readthedocs.io/en/latest/example_notebooks/overviews/An%20introduction%20to%20explainable%20AI%20with%20Shapley%20values.html, and Welcome to the SHAP documentation, https://shap.readthedocs.io/en/latest/, the disclosures of which are incorporated herein by reference in their entirety.

Moreover, the system leverages LLMs to translate complex model explanations into plain English, providing accessible and actionable insights for stakeholders such as marketers and analysts. This capability bridges the gap between technical model outputs and business decision-making, ensuring that all stakeholders can comprehend and utilize the insights effectively.

Notably, the system allows brands and companies to leverage their own first-party data to create unique segments/audiences and segmentation models that are finely tuned to their specific customer base and business needs. This tailored approach equips businesses with a profound understanding of their customer base, optimizing KPIs and enabling the development of more targeted and effective marketing strategies and tactics.

The foregoing summary is illustrative only and is not intended to be in any way limiting. These and other illustrative embodiments include, without limitation, apparatus, systems, methods and computer-readable storage media. In addition to the illustrative aspects, embodiments, and features described above, further aspects, embodiments, and features will become apparent by reference to the drawings and the following detailed description.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 7 through 11 are features of a comprehensive prompt data package according to an embodiment.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the illustrative embodiments. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 1:
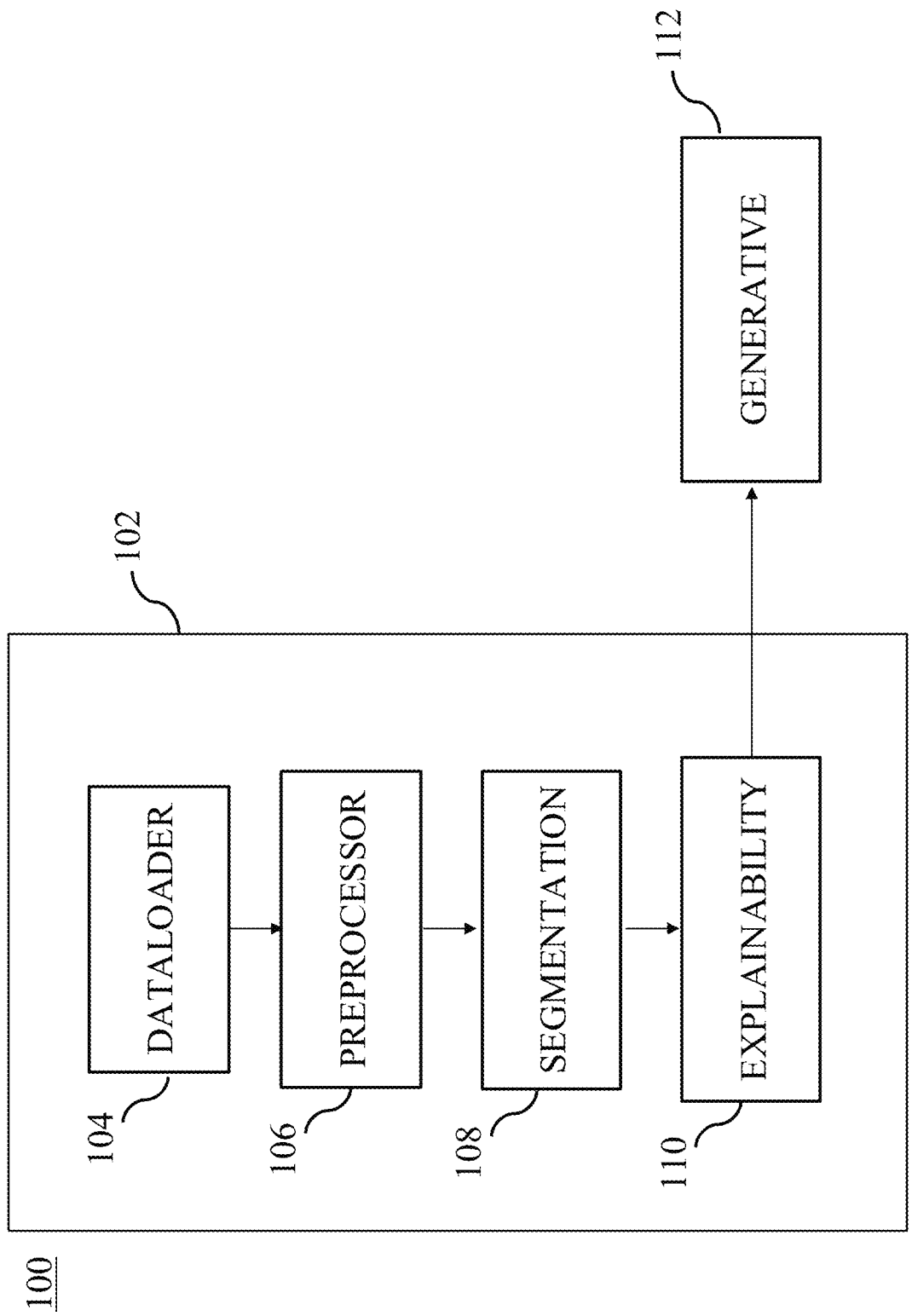
FIG. 1 is a diagram of a system according to an embodiment.

With reference to FIG. 1, a system 100 is disclosed in accordance with embodiments of the invention that segments a large dataset into distinct segments using artificial intelligence. System 100 is applicable across various industries (e.g., retail, finance, healthcare, etc.). A segmenter 102 comprises a dataloader module 104, preprocessor module 106, segmentation module 108, and explainability module 110. Dataloader module 104 accepts as input a dataset encompassing various aspects of customer interactions, including but not limited to demographics, behavioral data, transactional data, and other relevant information. The data may be "first-party data," which is collected and kept by a given brand through a direct relationship with the customer. Such data can come from website and app usage (i.e., behavioral data) or purchase history (i.e., transactional data). Utilizing first-party data and maintaining data security ensures adherence to privacy regulations. The brand may also purchase demographic data, e.g., household income, family size, etc., from partners such as credit card companies. The data may also be "zero-party data," which contains other interactions with customers such as survey responses and locations visited. The data may further comprise customer level calculations such as "loyalty tier," "lifetime value prediction" and "conversion rate."

The brand assigns a common customer ID to all data representative of a given customer. Dataloader module 104 receives a complete dataset as a final file where the data has been either aggregated or tied to one customer ID. Relevant information could be cleaning the column names so they are descriptive for the work being done and the GenAI or including additional file context information about the type of file, company and where the data came from.

Once the dataset is received, the AI process begins with data preprocessing by preprocessor module 106. In some embodiments, preprocessor module 106 applies autoencoders, a type of neural network designed to learn efficient representations of data, to create a compressed representation of the dataset by compressing the data into a lower-dimensional layer, and then reconstruct the original data while eliminating noise. The autoencoders cleanse and normalize the data, enhance data quality and segmentation accuracy, and facilitate feature learning of the data by extracting robust features from raw tabular customer data. In an embodiment, the input layer dimensions are configured to match the number of features in the tabular data. A dimension that balances compression and reconstruction quality may be set, for example, to 32 neurons for significant feature reduction.

Once the data is preprocessed, segmentation module 108 builds a custom segmentation pipeline tailored to the specific characteristics of each customer's dataset. This pipeline leverages an ensemble of machine learning algorithms to identify distinct customer segments or audiences, label the segments, and segment or assign customers into the distinct segments based on feature representations learned by the autoencoder network. In an embodiment, a custom pipeline specifically designed to handle high-dimensional, noisy tabular customer data is employed.

In some embodiments, the autoencoder functions to learn a latent representation of the data. The input layer is configured based on the number of features in the dataset, for example, 100 features. An encoder compresses the data through hidden layers to a reduced representation, set to, for example, 256 neurons. A decoder reconstructs the data from the compressed representation while learning to filter out noise. The autoencoder is trained on noisy data to reconstruct clean data, thereby enhancing robustness and generalization. Additional information on autoencoders and representation learning can be found at Understanding Representation Learning With Autoencoder, https://neptune.ai/blog/representation-learning-with-autoencoder, and What is an autoencoder?, https://www.ibm.com/topics/autoencoder, the disclosures of which are incorporated herein by reference in their entirety.

In some embodiments, a sophisticated dimensionality reduction technique is utilized to further reduce the dimensionality of the data while preserving its inherent structure for subsequent clustering. This technique is designed to scale efficiently with large datasets, ensuring that both the global and local structures of the high-dimensional data are maintained. By reducing the dimensionality, this technique facilitates efficient processing and analysis with minimal information loss, thereby enhancing the quality and interpretability of the clustering results. This reduction process is critical for handling wide tables with numerous features, ensuring that the essential characteristics of the data are retained while reducing computational complexity.

In some embodiments, an advanced clustering algorithm is employed to identify clusters within the data without the need for a predefined number of clusters. The clustering algorithm is capable of handling datasets with varying densities, allowing it to detect clusters of different shapes and sizes. It operates effectively in distinguishing between genuine clusters and noise, providing robustness in the presence of noisy data points. The algorithm's ability to manage varying densities and its robustness to noise are essential for accurately identifying and separating meaningful patterns within complex datasets. This functionality ensures that system 100 can adapt to diverse data distributions and provide reliable clustering outcomes in a wide range of scenarios.

System 100 continuously learns and adapts, refining segmentation model 102 over time to improve precision based on previous runs of similar datasets by measuring the performance of each step. Each pipeline is uniquely tailored to each customer and their specific data file due to several factors, including the unique characteristics of their data and the customization of the neural network architecture and preprocessing steps. Each customer's dataset includes a distinct set of features (e.g., demographics, transaction histories) that vary in number, type (e.g., numerical, categorical), and relevance. The noise level, missing values, and outliers in the data differ, necessitating customized preprocessing to ensure clean and usable input for the model. Further, different customers have varying segmentation goals and business needs, which influence how the pipeline processes and analyzes the data.

According to an embodiment, for each identified segment, system 100 trains a specific gradient boosting model using the segment labels as the target variable. This step involves hyperparameter optimization to ensure the best possible performance of the models. In some embodiments, system 100 employs Shapley values, a game theory-based approach, to quantify the importance of each feature in predicting the cohort label for each customer. This provides an indication of the most influential factors driving the segmentation, ensuring transparency and trust in the model's decision-making processes.

To make these technical explanations accessible to non-technical stakeholders, explainability module 110 leverages Explainable Artificial Intelligence ("XAI") and LLMs to generate concise, plain English explanations of the influential features for each cohort. The field of XAI has emerged to address the need for transparency and interpretability in AI models. XAI techniques provide insights into how models arrive at their predictions, enabling businesses to understand the underlying factors driving customer segmentation. Examples of XAI reasoning and implementation are known from U.S. Pat. No. 11,615,331, which issued on Mar. 28, 2023, the disclosure of which is incorporated herein by reference in its entirety.

The advent of LLMs offers advanced capabilities for generating natural language explanations. These models can translate complex technical outputs into clear, accessible narratives that can be easily understood by non-technical stakeholders such as marketers and business analysts. This capability bridges the communication gap between technical and non-technical teams, facilitating more informed decision-making.

The present invention integrates advanced machine learning algorithms, XAI techniques, and LLMs to provide a comprehensive solution for customer cohort segmentation and optimization. System 100 not only segments customers with high precision but also optimizes company KPIs by tailoring marketing strategies to the specific characteristics and preferences of distinct customer cohorts. By providing clear, actionable insights through natural language explanations, the invention empowers businesses to develop tailored marketing strategies that resonate with their customer base, ultimately driving better business outcomes.

According to an embodiment, explainability module 110 extracts segment characteristics and provides summary descriptions, segment insights (which compare a given segment to the general population), personas (using data values from actual customers in a given segment), and recommendations for marketing. This information is sent to generative module 112 which generates prompts to gain a deeper understanding of customer segments.

Figure 2:
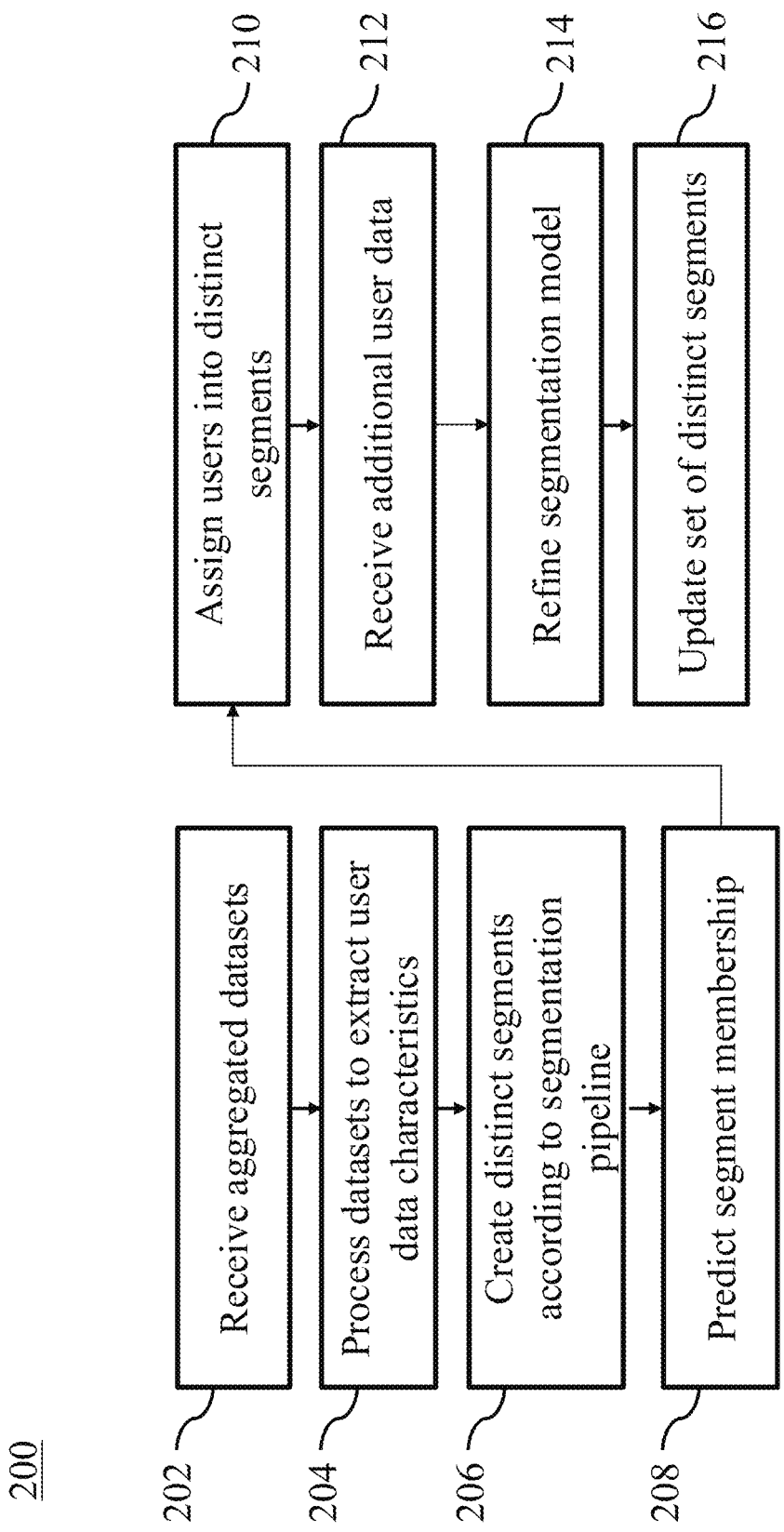
FIG. 2 is a flow diagram of an example process for segmenting a large dataset using artificial intelligence according to an embodiment.

With reference to FIG. 2, a process 200 of using system 100 to segment a large dataset into distinct segments in accordance with some embodiments will now be described. The process of FIG. 2 comprises steps 202 through 216 and is suitable for use in system 100 but is more generally applicable to other types of systems for dataset segmentation using artificial intelligence.

At step 202, dataloader module 104 receives aggregated datasets comprising customer or user data and customer or user IDs assigned thereto, the user data comprising demographic data, behavioral data, and transactional data for given users. In an embodiment, the datasets comprise first-party user data acquired through a direct relationship with the given users. The datasets may also comprise user data from multiple data sources.

At step 204, preprocessor module 106 processes the datasets to extract user data characteristics. The user data characteristics may vary in number, type, and relevance. The type of user data characteristics may comprise numerical or categorical characteristics representative of behavioral or transactional data. User data characteristics may also comprise users' business goals and needs. In an embodiment, a denoising autoencoder may be used to reduce dimensionality and enhance quality of the user data as described above. For example, an autoencoder may be used to reduce dimensionality and enhance quality of the user data by compressing the dataset into a lower-dimensional layer to create a compressed representation of the dataset and reconstructing the dataset from the compressed representation while reducing data dimensionality and eliminating noise.

At steps 206 and 208, segmentation module 108 creates distinct segments according to a segmentation pipeline based on the extracted user data characteristics and predicts segment membership using a gradient boosting model. In an embodiment, a machine learning algorithm is used to create the distinct segments. In an embodiment, the gradient boosting model is trained with hyperparameter optimization. At step 210, segmentation module 108 assigns users into given ones of the distinct segments according to an ensemble machine learning-based segmentation model and the extracted user data characteristics, wherein the ensemble machine learning-based segmentation model integrates multiple clustering algorithms. In an embodiment, the ensemble machine learning-based segmentation model integrates multiple clustering algorithms such as k-means clustering, hierarchical clustering, and density-based clustering.

At steps 212, 214 and 216, system 100 receives additional user data, refines the segmentation model according to the additional user data, and updates a set of the distinct segments according to the refined segmentation model. In an embodiment, the segmentation model is refined according to monitored changes in segment membership, segment evolution, and emerging trends. Updating a set of the distinct segments may comprise changing parameters of an existing segment or creating a new segment.

Figure 3:
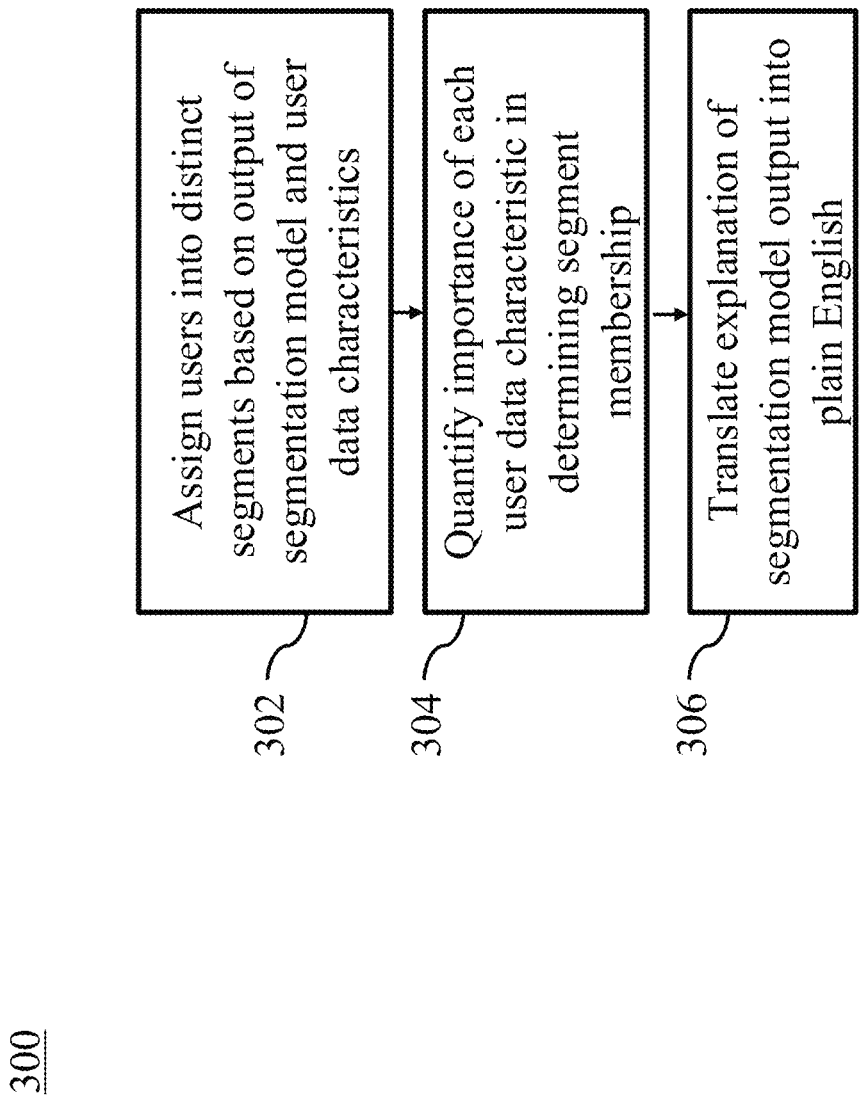
FIG. 3 is a flow diagram of an example process for explaining the importance of customer features in predicting segment membership using artificial intelligence according to an embodiment.

With reference to FIG. 3, a process 300 of using system 100 to elucidate the importance of customer features (or user characteristics) in predicting segment membership in accordance with embodiments of the invention will now be described. The process of FIG. 3 comprises steps 302 through 306 and is suitable for use in system 100 but is more generally applicable to other types of systems for dataset segmentation using artificial intelligence.

At step 302, segmentation module 108 assigns users into distinct segments based on an output of a segmentation model and user data characteristics extracted from aggregated datasets comprising user data. In an embodiment, the segmentation model comprises an ensemble machine learning-based segmentation model which integrates multiple clustering algorithms such as k-means clustering, hierarchical clustering, and density-based clustering. At step 304, explainability module 110 quantifies an importance of each of the user data characteristics in determining segment membership using game theory. In an embodiment, Shapley values are used to quantify an importance of each of the user data characteristics to identify given ones of the user data characteristics that are most significant in defining the distinct segments. At step 306, explainability module 110 translates an explanation of the output of the segmentation model into plain English using an LLM, the explanation comprising an importance of each of the user data characteristics in determining segment membership. In an embodiment, system 100 stores the segmentation model, the explanation of the output of the segmentation model, and the distinct segments for future reference.

Figure 4:
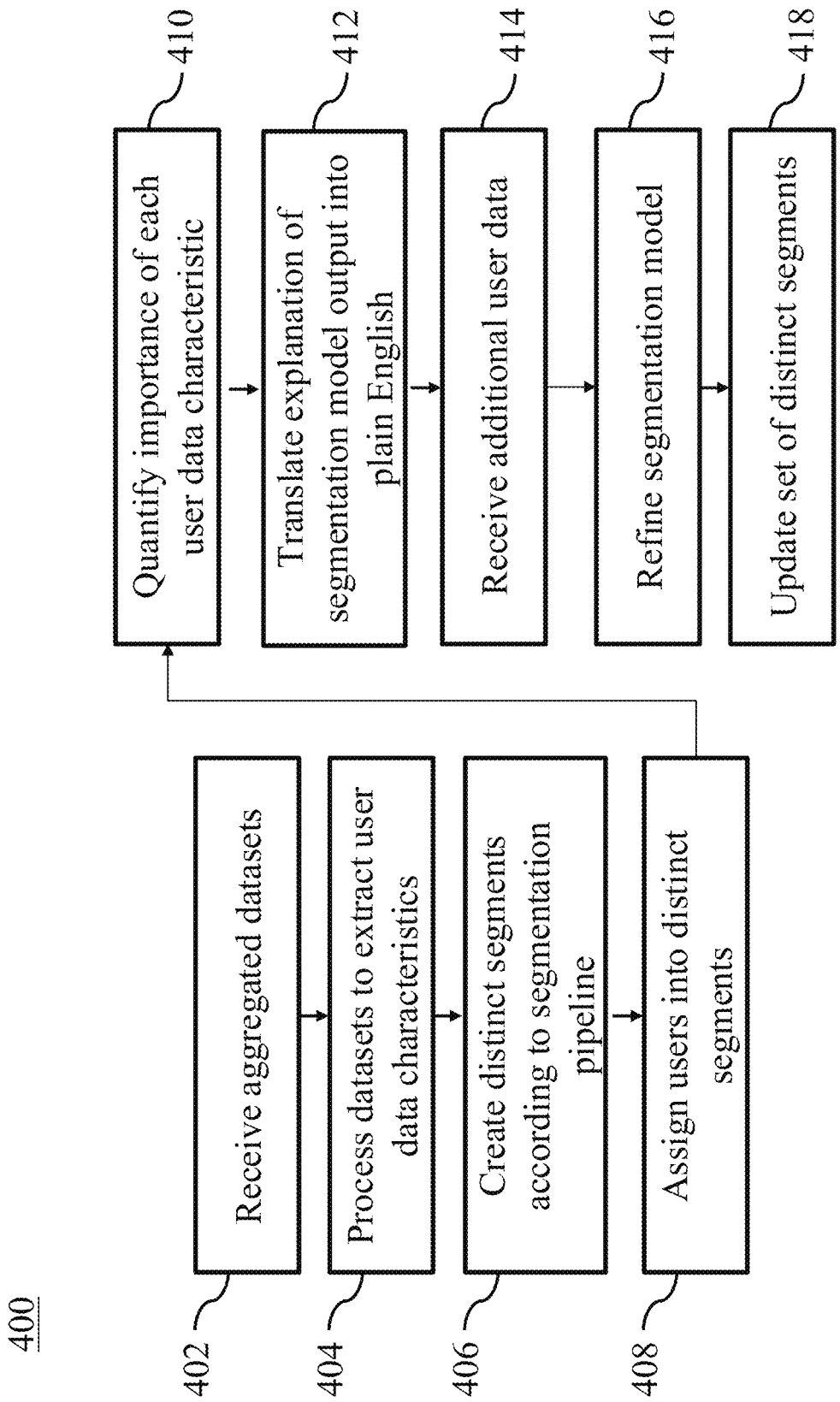
FIG. 4 is a flow diagram of an example process for segmenting a large dataset and explaining the importance of customer features using artificial intelligence according to an embodiment.

With reference to FIG. 4, a process 400 of using system 100 to segment a large dataset into distinct segments and to elucidate the importance of customer features (or user characteristics) in predicting segment membership in accordance with embodiments of the invention will now be described. The process of FIG. 4 comprises steps 402 through 418 and is suitable for use in system 100 but is more generally applicable to other types of systems for dataset segmentation using artificial intelligence.

At step 402, dataloader module 104 receives aggregated datasets comprising customer or user data and customer or user IDs assigned thereto. At step 404, preprocessor module 106 processes the datasets to extract user data characteristics. At step 406, segmentation module 108 creates distinct segments according to a segmentation pipeline based on the extracted user data characteristics. At step 408, segmentation module 108 assigns users into given ones of the distinct segments according to an ensemble machine learning-based segmentation model and the extracted user data characteristics. At step 410, explainability module 110 quantifies an importance of each of the user data characteristics in determining segment membership using game theory. At step 412, explainability module 110 translates an explanation of the output of the segmentation model into plain English using an LLM.

At steps 414 through 418, system 100 receives additional user data, refines the segmentation model according to the additional user data, and updates a set of the distinct segments according to the refined segmentation model. In an embodiment, system 100 stores the segmentation model, the explanation of the output of the segmentation model, and the distinct segments for future reference.

The particular processing operations and other system functionality described in conjunction with the flow diagrams of FIGS. 2 through 4 are presented by way of illustrative example only and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed embodiments.

Functionality such as that described in conjunction with the processes of FIGS. 2-4 may be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

Figure 5:
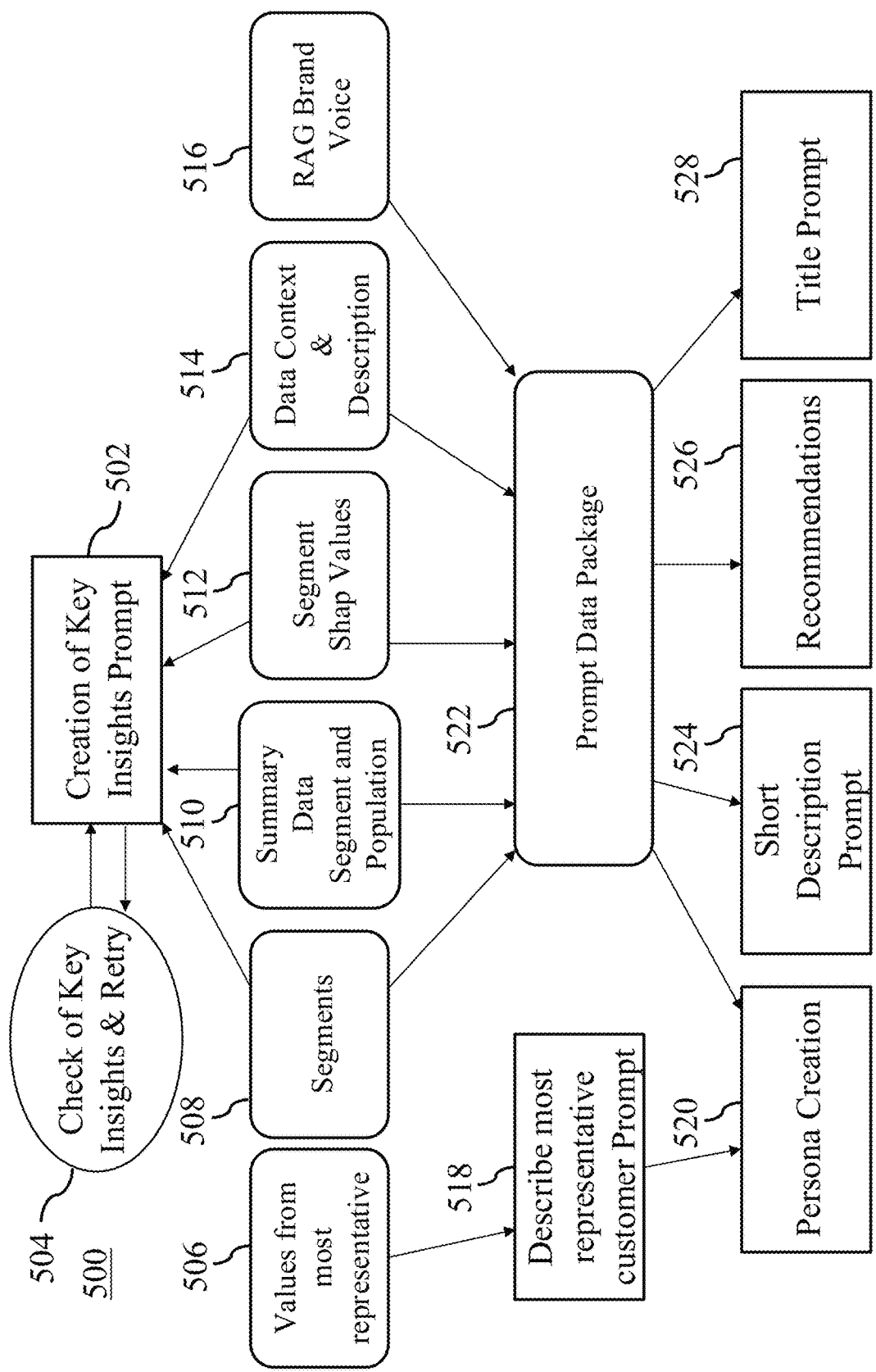
FIGS. 5 through 6B are a diagram of a system according to an embodiment.
Figure 6:
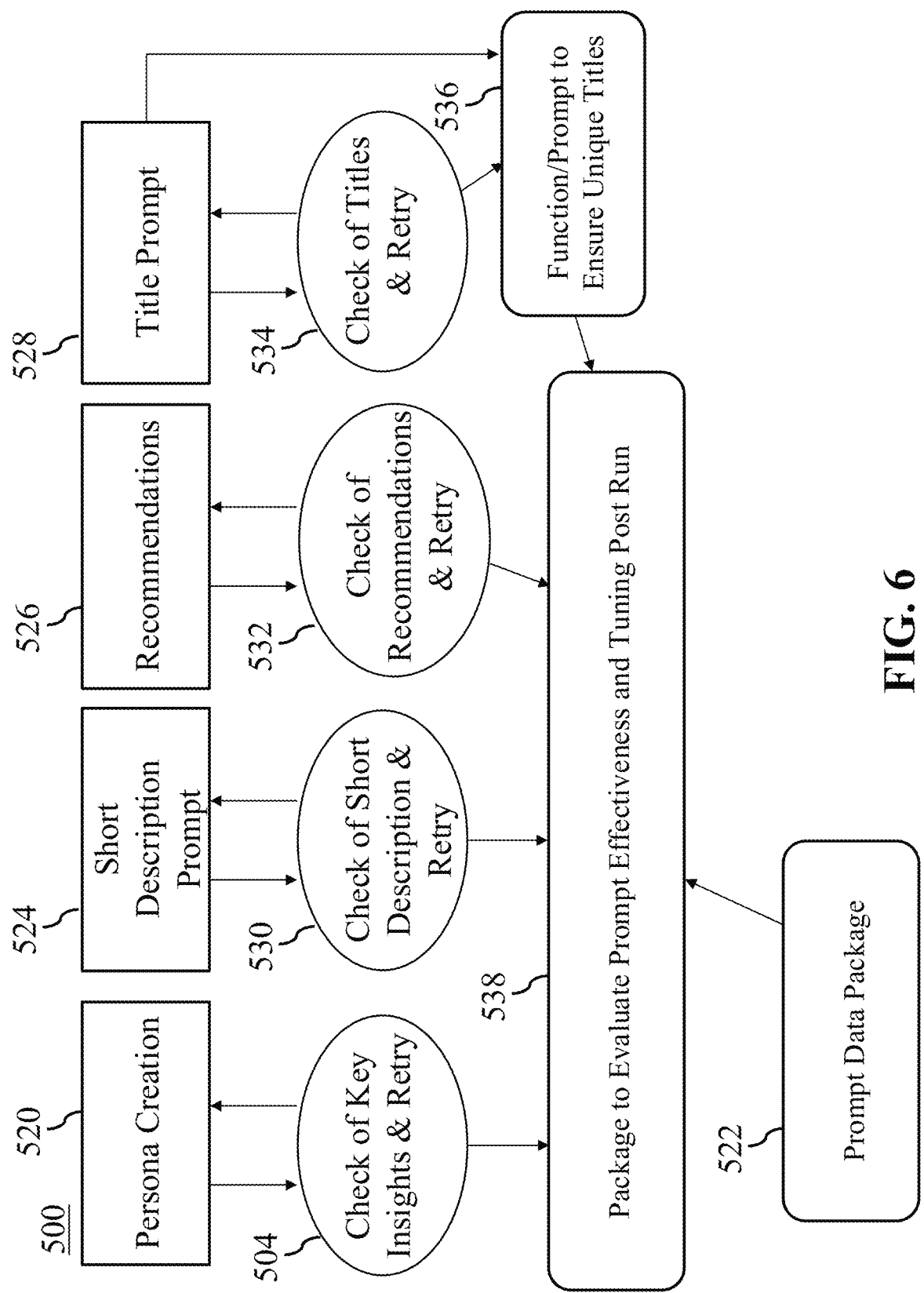
Figure 6B:
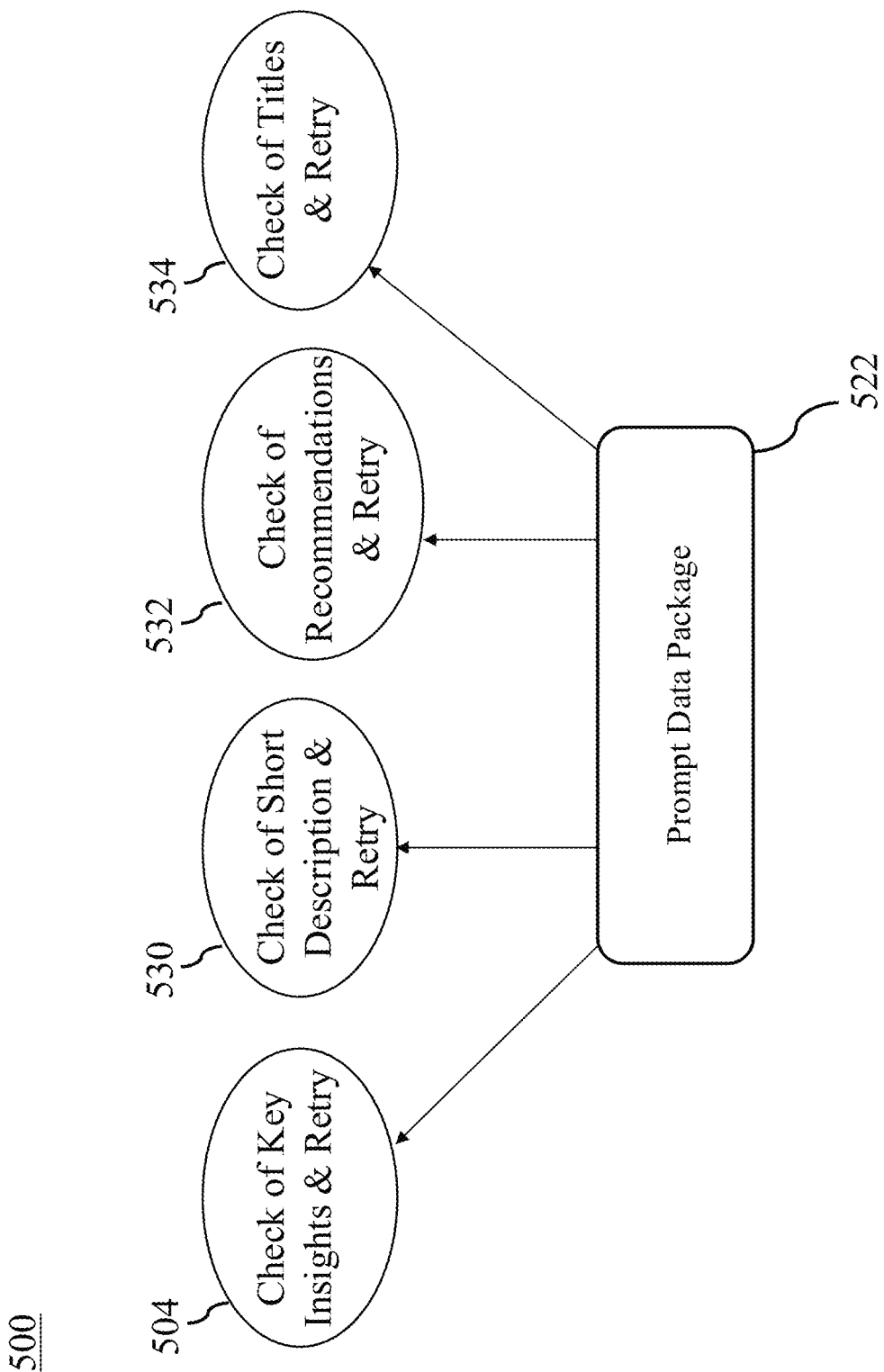

With reference to FIGS. 5 through 6B, a generative prompt and continual evaluation system 500, embodied in generative module 112 of system 100, is described. System 500 integrates Shapley values for features, actual values, previous prompts, and company-specific information to ensure the outputs are accurate, relevant, and actionable. Libraries like Instructor are used to maintain the trustworthiness of the generated content and prevent contradictory or untrue statements. Additional information on Instructor and how it provides structured outputs powered by LLMs can be found at Instructor, Generating Structure from LLMs, https://python.useinstructor.com/, and Instructor: Structured LLM Outputs, https://pypi.org/project/instructor/, the disclosures of which are incorporated herein by reference in their entirety. Continuous evaluation of the prompts and system performance ensures consistent quality and improvement.

In some embodiments, system 500 uses Shapley values 512 to explain the contribution of each feature to the characteristics of a segment 508. This helps in identifying the most significant attributes that define each segment, enabling the generation of contextually rich and relevant prompts. Using Shapley values 512, key insights 502 are derived for each segment 508, which are then used to create prompts that highlight the most important features and their impact.

In some embodiments, system 500 extracts the actual data values 506 from, for example, the top 10 most representative customers in each segment 508. These values provide concrete examples and ground the generated prompts in real data. In addition, summary data and population statistics 510 of each segment 508 are used to provide an overview and context for the prompts.

Previous prompts and descriptions 514 provide a historical context, ensuring continuity and consistency in messaging. Company-specific information, such as brand voice and style guidelines, are integrated to align the prompts with the company's communication strategy. In some embodiments, the Reinforcement of Authenticity and Governance ("RAG") brand voice 516 ensures that the prompts adhere to the company's tone, style, and messaging guidelines, maintaining a consistent and trustworthy voice.

With reference to FIGS. 5 through 11, the combination of Shapley values, actual values, previous prompts, and company information is packaged into a comprehensive prompt data package 522 in accordance with embodiments of the invention. This package is used to generate various types of prompts, including key insights 502, personas 520, short descriptions 524, recommendations 526, and titles 528. System 500 also provides overall insights detailing where the segments differ and where to look to improve incrementality.

Figure 7:
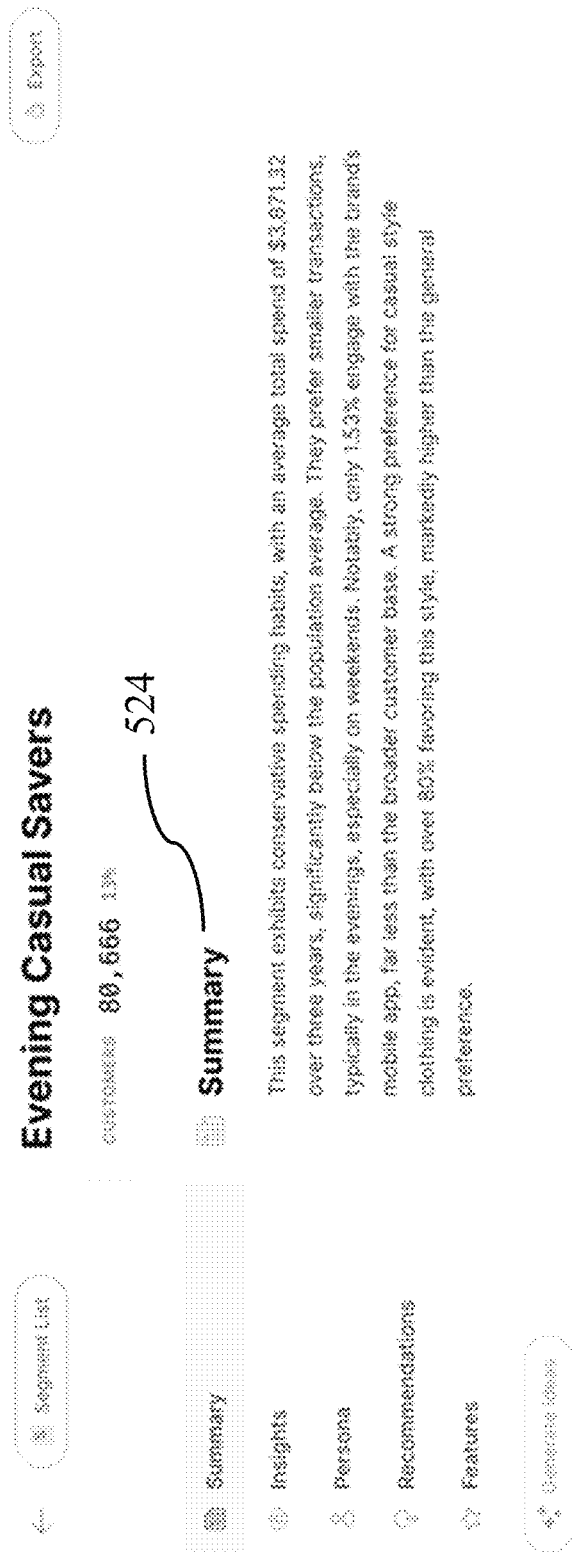

With reference to FIG. 7, in accordance with embodiments of the invention, summaries comprising concise and informative descriptions, or short descriptions 524, are generated to quickly convey the essence of each segment 508. For example, a summary 524 may include information regarding the spending habits of the customers within a given segment and how they compare to other customers in the customer base. Summary 524 may also include information regarding customers' mobile application usage, product preference, and other comparative information, including statistics.

Figure 8:
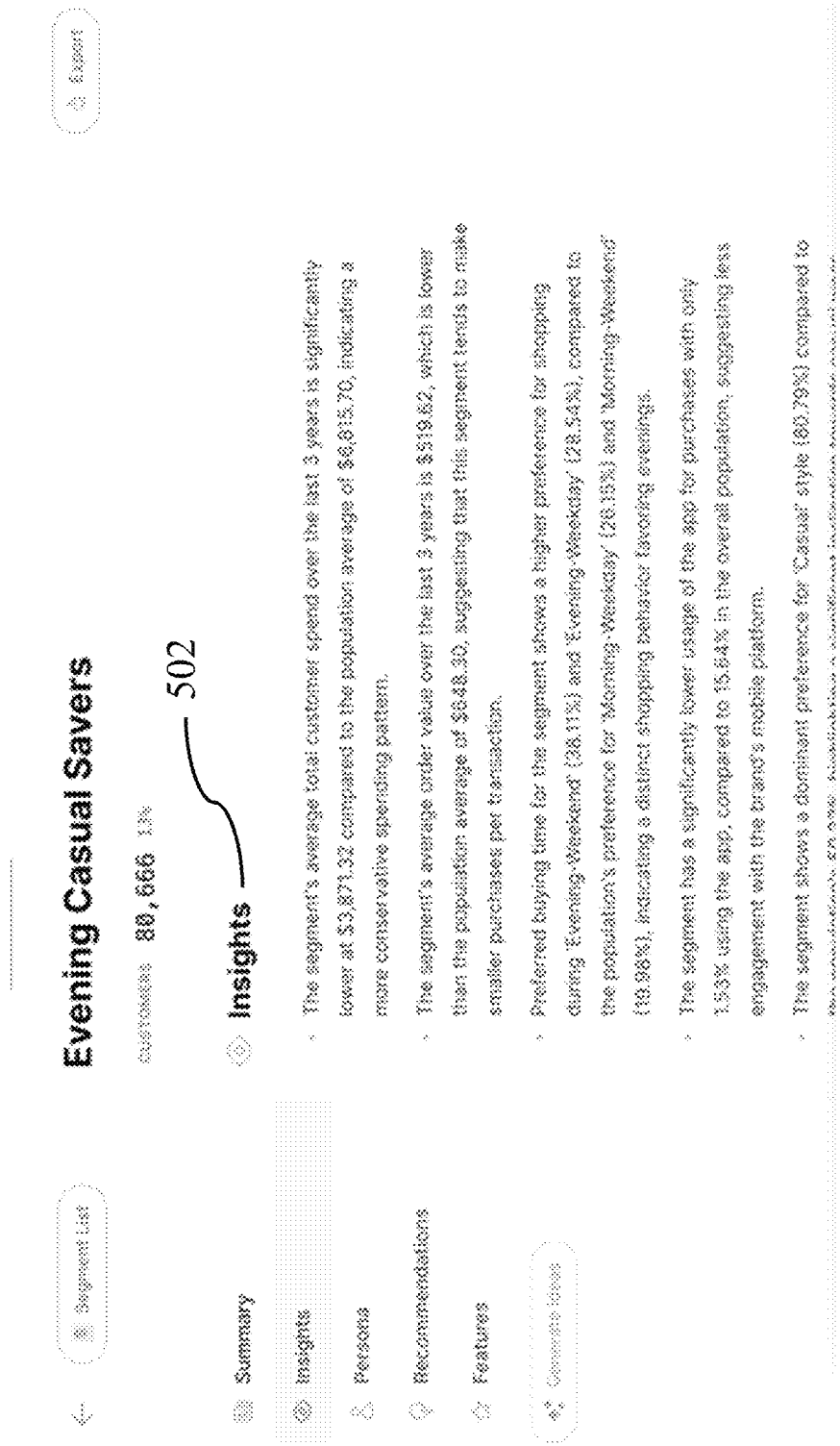

With reference to FIG. 8, in accordance with embodiments of the invention, key insights 502 are derived for each segment 508, which are then used to create prompts that highlight the most important features and their impact. Key insights 502 are used to explain why and how the segment is different from the overall customer population. For example, key insights 502 may include a segment's spending patterns, order value, preferred buying time, mobile application usage, style preference, and other comparative information, including numerical information.

Figure 9:
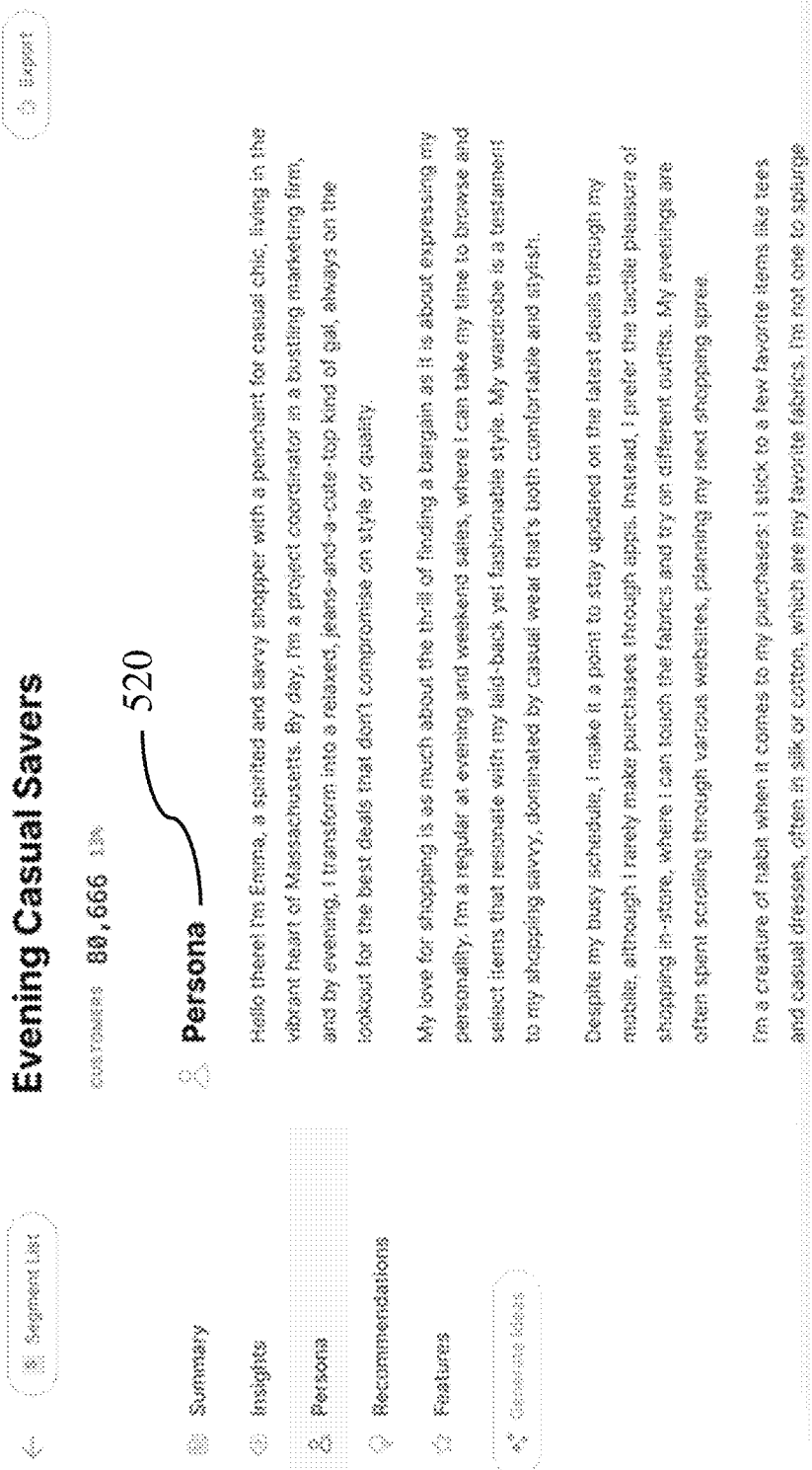

With reference to FIG. 9, in accordance with embodiments of the invention, detailed personas 520 are created to represent different segments 508 using the most representative customer data 518 and key insights 502. For example, a persona representative of a given segment may provide information regarding its style preference, location, career, interests, purchase habits, wardrobe, mobile app usage, and more. Creation of a quantitative persona 520 leverages LLMs, existing persona best practices, and segmentation data and information. Persona 520 can show what a typical person within the segment might like and respond to in an approachable holistic way.

Figure 10:
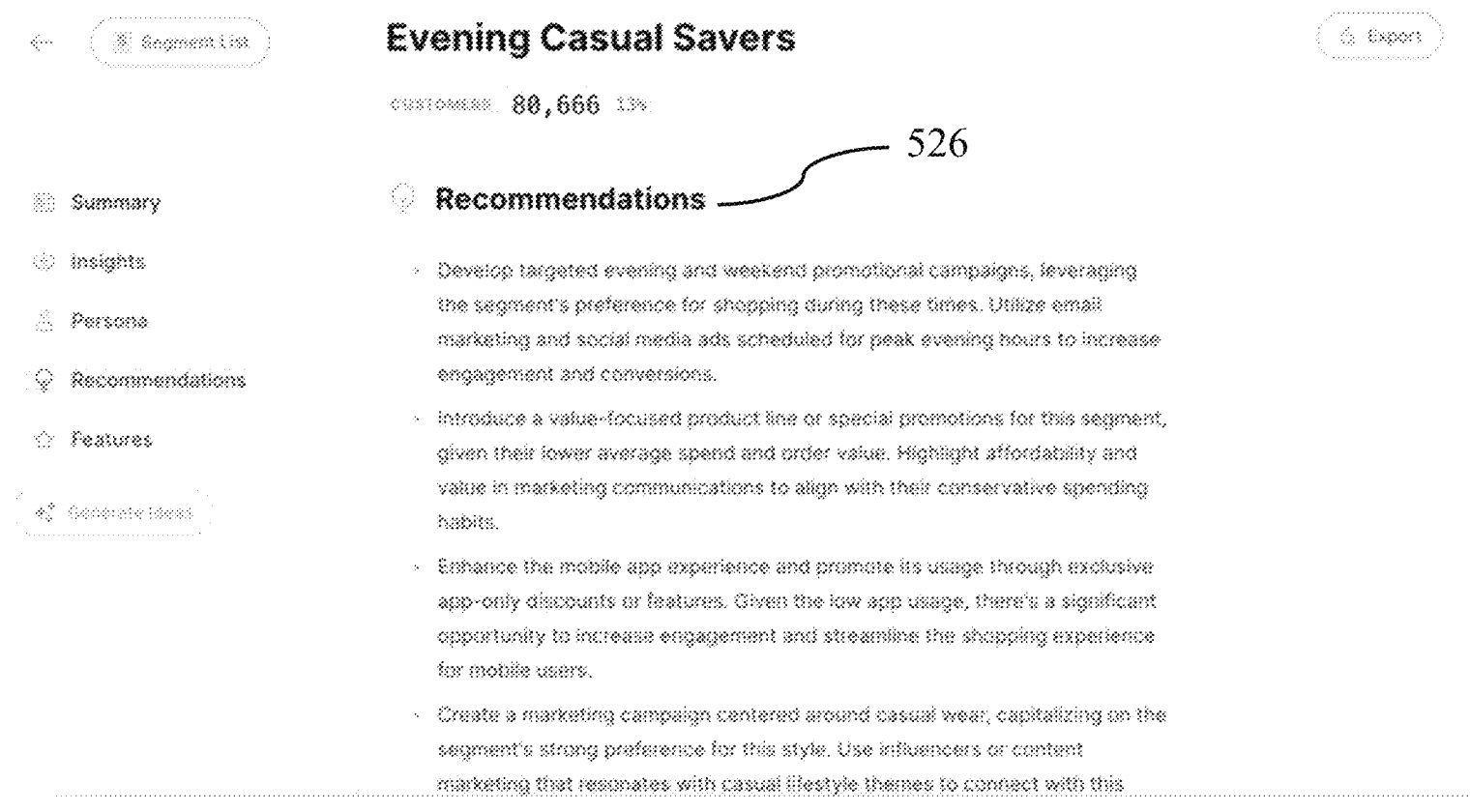

With reference to FIG. 10, actionable recommendations 526 are formulated for marketing and engagement strategies based on the insights and representative data in accordance with embodiments of the invention. Recommendations 526 for a given segment may include, for example, tips to develop targeted evening and weekend promotional campaigns to leverage the segment's preference for shopping during these times.

Figure 11:
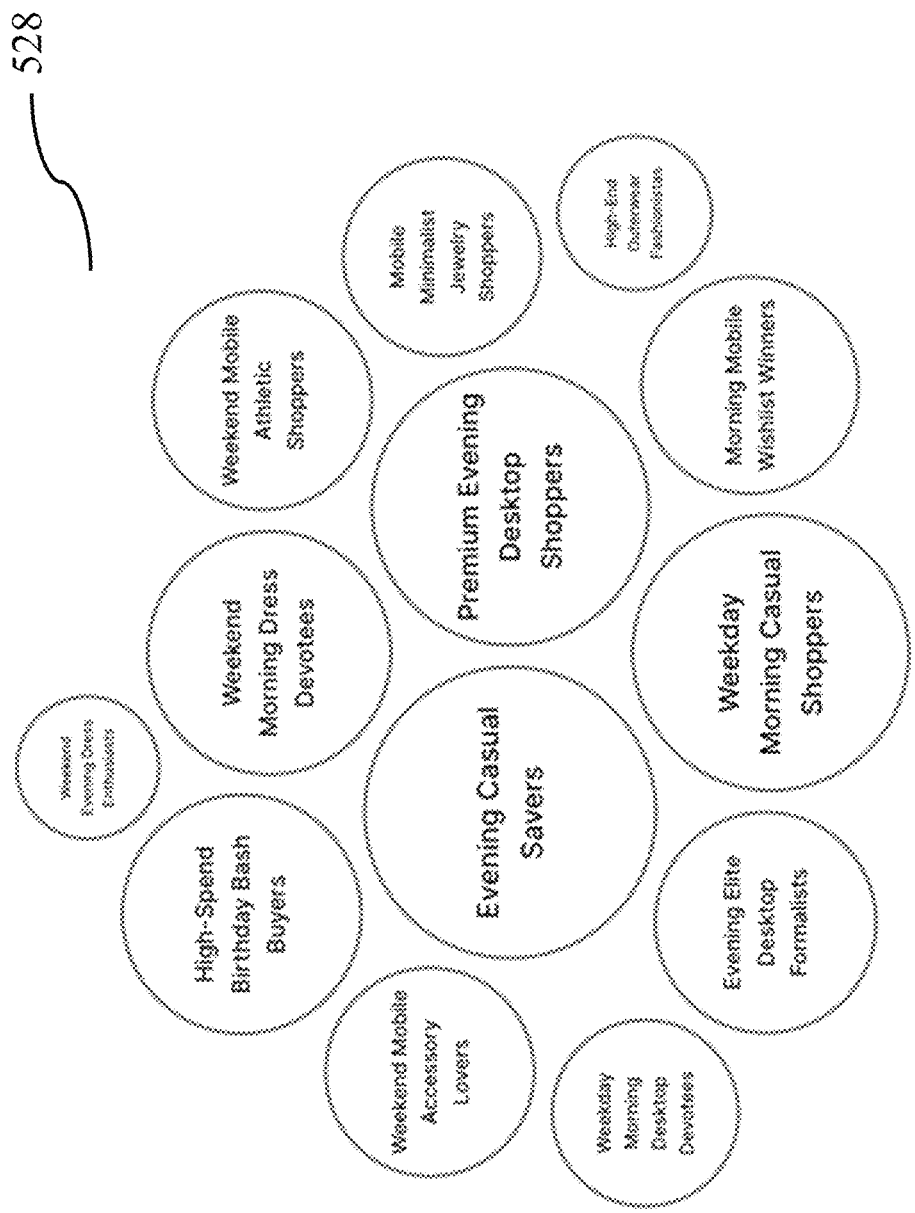

With reference to FIG. 11, titles 528 are generated to capture attention and summarize the content effectively in accordance with embodiments of the invention. Titles 528 are built to be unique and memorable, such as "Evening Casual Savers," "Premium Evening Desktop Shoppers," and "Morning Mobile Wishlist Winners."

System 500 employs various measures for quality control and continuous improvement. Generated key insights 502 are reviewed and validated to ensure accuracy and relevance. If necessary, system 500 retries to refine the insights 504. Short descriptions 524 are evaluated for clarity and impact, with retries 530 to improve quality if needed. Recommendations 526 are scrutinized 532 for practicality and effectiveness, with adjustments made as required. Titles 528 are reviewed 534 for uniqueness and engagement potential, ensuring they stand out and align with the intended message. Furthermore, a specific function or prompt 536 is used to generate unique titles, thereby avoiding repetition and enhancing distinctiveness.

In some embodiments, after generating and deploying the prompts, their effectiveness is continuously evaluated 538. Feedback is gathered to assess the impact and relevance of the prompts, and system 500 is tuned accordingly to improve future performance.

By integrating these components and following a meticulous process, system 500 ensures that the generated prompts are not only accurate and relevant but also trustworthy and aligned with the company's strategic goals. The use of libraries like Instructor helps in maintaining the quality and integrity of the outputs, while continuous evaluation and improvement processes ensure that system 500 evolves and adapts to changing needs and contexts. Metadata and traces are stored and continuously reviewed to create new updated prompts.

System 500 offers the ability to display how customers are segmented over time, providing insights into segment evolution. By monitoring changes in segment membership and the underlying factors driving these changes, businesses can gain a deeper understanding of how their customer base is evolving. Monitoring groups of segments across files or over time, also known as cohorts, is particularly useful for identifying emerging trends and adapting marketing strategies accordingly.

Furthermore, system 500 can combine segments from multiple files based on common customer IDs, creating new explainability and understanding of customer behavior. This holistic approach allows businesses to continuously update segmentation models with new data, enabling the identification of new customer cohorts as behaviors and preferences change. System 500 also allows businesses to integrate data from different files using common customer IDs, resulting in more comprehensive customer profiles and better segmentation accuracy. This is done by combining the information from multiple runs to create a new "cohort" of customers. Information for customers that have had data in multiple files or runs joined on their customer ID is evaluated as a whole for each combination of segments. Finally, businesses may monitor how customers move between segments over time, providing valuable insights into changing behaviors and preferences.

In some embodiments, system 500 includes robust logging and storage mechanisms to ensure the reproducibility and traceability of the entire process. Model performance metrics, model and configuration parameters, and outputs are logged, and the trained models, explanations, and cohort labels are stored securely. This allows for easy auditing, model versioning, and future reference, ensuring compliance with industry standards and regulations.

FIGS. 1 through 11 are conceptual illustrations allowing for an explanation of the disclosed embodiments of the invention. Notably, the figures and examples above are not meant to limit the scope of the invention to a single embodiment, as other embodiments are possible by way of interchange of some or all of the described or illustrated elements. Moreover, where certain elements of the disclosed embodiments can be partially or fully implemented using known components, only those portions of such known components that are necessary for an understanding of the disclosed embodiments are described, and detailed descriptions of other portions of such known components are omitted so as not to obscure the disclosed embodiments. In the present specification, an embodiment showing a singular component should not necessarily be limited to other embodiments including a plurality of the same component, and vice-versa, unless explicitly stated otherwise herein. Moreover, terms in the specification or claims are not intended to be ascribed an uncommon or special meaning unless explicitly set forth as such. Further, the disclosed embodiments encompass present and future known equivalents to the known components referred to herein by way of illustration.

It should be understood that the various aspects of the embodiments could be implemented in hardware, firmware, software, or combinations thereof. In such embodiments, the various components and/or steps would be implemented in hardware, firmware, and/or software to perform the functions of the disclosed embodiments. That is, the same piece or different pieces of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description will so fully reveal the general nature of the disclosed embodiments that others can, by applying knowledge within the skill of the relevant art(s) (including the contents of the documents cited and incorporated by reference herein), readily modify and/or adapt for various applications such specific embodiments, without undue experimentation, without departing from the general concept of the disclosed embodiments. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for segmenting a large dataset into distinct segments using artificial intelligence (AI), the method performed by at least one processor comprising hardware, the method comprising:
   receiving aggregated datasets comprising user data and user IDs assigned thereto from multiple data sources, the user data comprising demographic data, behavioral data, and transactional data for given users;
   processing the datasets by denoising and feature-learning the datasets by a neural network-based denoising autoencoder to reduce dimensionality, enhance quality of the user data, and enhance segmentation accuracy;
   extracting user data characteristics from the processed datasets;
   creating distinct segments according to a segmentation pipeline based on the extracted user data characteristics;
   assigning users membership into given ones of the distinct segments according to an ensemble machine learning-based segmentation model and the extracted user data characteristics, wherein the ensemble machine learning-based segmentation model integrates multiple clustering algorithms, the multiple clustering algorithms comprising k-means clustering, hierarchical clustering, and density-based clustering;
   quantifying, by an explainability module using game theory and Shapley values, an importance of each of the extracted user data characteristics in creating the distinct segments and assigning users membership into the distinct segments;
   translating, by an explainability module using a large language model, into plain English the importance of each of the user data characteristics in determining segment membership;
   storing the segmentation model, distinct segments and explanation in a database;
   receiving additional user data;
   continuously refining the segmentation model according to the additional user data to improve precision;
   updating a set of the distinct segments according to the refined segmentation model;
   generating marketing recommendations and key insights for each one of the distinct segments, the key insights comprising comparative and numerical information representative of each one of the distinct segments; and
   creating a plurality of detailed personas based on the user data characteristics and key insights, each one of the plurality of detailed personas comprising digital usage data representative of a given distinct segment.

2. The method of claim 1, wherein creating distinct segments according to a segmentation pipeline based on the extracted user data characteristics comprises creating, by a machine learning algorithm, distinct segments according to a segmentation pipeline based on the extracted user data characteristics.

3. The method of claim 1, wherein assigning users membership into given ones of the distinct segments according to an ensemble machine learning-based segmentation model comprises assigning users into given ones of the distinct segments according to an ensemble machine learning-based segmentation model, wherein the ensemble machine learning-based segmentation model integrates multiple clustering algorithms such as k-means clustering, hierarchical clustering, and density-based clustering for high-dimensional user data.

4. The method of claim 1, wherein receiving aggregated datasets comprising user data comprises receiving aggregated datasets comprising first-party user data acquired through a direct relationship with the given users.

5. The method of claim 1, wherein receiving aggregated datasets comprising user data comprises receiving aggregated datasets comprising user data from multiple data sources.

6. The method of claim 1, wherein processing the datasets to extract user data characteristics comprises processing the datasets to extract user data characteristics that vary in number, type, and relevance.

7. The method of claim 6, wherein the type of user data characteristics comprises numerical or categorical characteristics representative of behavioral or transactional data.

8. The method of claim 1, wherein processing the datasets to extract user data characteristics comprises processing the datasets to extract user data characteristics such as the given users' business goals and needs.

9. The method of claim 1, wherein refining the segmentation model further comprises refining the segmentation model according to monitored changes in segment membership, segment evolution, and emerging trends.

10. The method of claim 1, wherein updating a set of the distinct segments comprises changing parameters of an existing segment.

11. The method of claim 1, wherein updating a set of the distinct segments comprises creating a new segment.

12. The method of claim 1, wherein assigning users membership into given ones of the distinct segments according to an ensemble machine learning-based segmentation model and the extracted user data characteristics comprises predicting segment membership using a gradient boosting model trained with hyperparameter optimization.

13. The method of claim 1, wherein processing the datasets further comprises denoising and feature learning the datasets by an autoencoder to reduce dimensionality and enhance quality of the user data by:
    compressing the dataset into a lower-dimensional latent representation of the dataset for clustering efficacy; and
    reconstructing the dataset from the compressed representation while reducing data dimensionality and eliminating noise.

14. The method of claim 1, wherein creating a plurality of detailed personas comprises creating a plurality of detailed personas comprising one or more of a style preference, location, career, interests, purchase habits, wardrobe, and mobile application usage representative of a given distinct segment.

15. A method performed by at least one processor comprising hardware, the method comprising:
    assigning users membership into distinct segments based on an output of a segmentation model and user data characteristics extracted from aggregated datasets comprising user data, wherein the user data is from multiple data sources and the aggregated datasets are processed by denoising and feature-learning the datasets by a neural network-based using a denoising autoencoder to reduce dimensionality, enhance quality of the user data, and enhance segmentation accuracy;
    quantifying, by an explainability module using game theory and Shapley values, an importance of each of the user data characteristics in determining segment membership;
    translating, by an explainability module using a large language model (LLM), an explanation of the output of the segmentation model into plain English, the explanation comprising an importance of each of the user data characteristics in determining segment membership;
    storing the segmentation model, distinct segments and explanation in a database;
    generating marketing recommendations and key insights for each one of the distinct segments, the key insights comprising comparative and numerical information representative of each one of the distinct segments; and
    creating a plurality of detailed personas based on the user data characteristics and key insights, each one of the plurality of detailed personas representing a given distinct segment.

16. The method of claim 15, wherein quantifying an importance of each of the user data characteristics comprises quantifying, using Shapley values, an importance of each of the user data characteristics to identify given ones of the user data characteristics that are most significant in defining the distinct segments.

17. The method of claim 15, wherein assigning users membership into distinct segments based on an output of a segmentation model comprises assigning users into distinct segments based on an output of an ensemble machine learning-based segmentation model which integrates multiple clustering algorithms such as k-means clustering, hierarchical clustering, and density-based spatial clustering of applications with noise.

18. The method of claim 15, wherein the method further comprises storing the segmentation model, the explanation of the output of the segmentation model, and the distinct segments for future reference.

19. The method of claim 15, wherein creating a plurality of detailed personas comprises creating a plurality of detailed personas comprising one or more of a style preference, location, career, interests, purchase habits, wardrobe, and mobile application usage representative of a given distinct segment.

20. A method performed by at least one processor comprising hardware, the method comprising:
    receiving aggregated datasets comprising user data and user IDs assigned thereto, wherein the user data is from multiple data sources;
    processing the datasets by denoising and feature-learning the datasets by a neural network-based denoising autoencoder to reduce dimensionality, enhance quality of the user data, and enhance segmentation accuracy;
    extracting user data characteristics from the processed datasets;
    creating distinct segments according to a segmentation pipeline based on the extracted user data characteristics;
    assigning users membership into given ones of the distinct segments according to an ensemble machine learning-based segmentation model and the extracted user data characteristics;
    quantifying, by an explainability module using game theory and Shapley values, an importance of each of the user data characteristics in determining segment membership;
    translating, by an explainability module using a large language model (LLM), an explanation of the output of the segmentation model into plain English;
    storing the segmentation model, distinct segments and explanation in a database;

receiving additional user data;

refining the segmentation model according to the additional user data;

updating a set of the distinct segments according to the refined segmentation model;

generating marketing recommendations and key insights for each one of the distinct segments, the key insights comprising comparative and numerical information representative of each one of the distinct segments; and creating a plurality of detailed personas based on the user data characteristics and key insights, each one of the plurality of detailed personas comprising purchase habits representative of a given distinct segment.

21. The method of claim 20, wherein the method further comprises storing the segmentation model, the explanation of the output of the segmentation model, and the distinct segments for future reference.

22. The method of claim 20, wherein creating a plurality of detailed personas comprises creating a plurality of detailed personas comprising one or more of a style preference, location, career, interests, purchase habits, wardrobe, and mobile application usage representative of a given distinct segment.

* * * * *